(12) United States Patent
Johnson et al.

(10) Patent No.: US 11,603,037 B1
(45) Date of Patent: Mar. 14, 2023

(54) VEHICLE APPLIQUE LIGHTING SYSTEM AND LIGHTING METHOD

(71) Applicant: Ford Global Technologies, LLC, Dearborn, MI (US)

(72) Inventors: Aaron Bradley Johnson, Allen Park, MI (US); Luciano Lukacs, Plymouth, MI (US); Michael L. Merritt, Farmington, MI (US); Dean Carbis, Bloomfield Hills, MI (US); Joshua D. Schwab, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/579,901

(22) Filed: Jan. 20, 2022

(51) Int. Cl.
*B60Q 1/28* (2006.01)
*F21V 21/08* (2006.01)
*F21V 7/04* (2006.01)
*F21S 4/28* (2016.01)
*B60Q 1/26* (2006.01)
*F21V 7/24* (2018.01)
*F21Y 113/10* (2016.01)
*F21Y 115/10* (2016.01)

(52) U.S. Cl.
CPC ............. *B60Q 1/28* (2013.01); *B60Q 1/2661* (2013.01); *B60Q 1/2696* (2013.01); *F21S 4/28* (2016.01); *F21V 7/04* (2013.01); *F21V 7/24* (2018.02); *F21V 21/08* (2013.01); *F21Y 2113/10* (2016.08); *F21Y 2115/10* (2016.08)

(58) Field of Classification Search
CPC .......... B60Q 1/26; B60Q 1/2661–2696; B60Q 1/28–326; F21S 4/20–28; F21V 7/04; F21V 7/24; F21V 21/08; F21Y 2113/10; F21Y 2115/10
See application file for complete search history.

(56) References Cited

U.S. PATENT DOCUMENTS

| 2,403,856 | A | 7/1946 | Gonzalez |
| 4,920,460 | A | 4/1990 | Mori |
| 9,714,749 | B1 | 7/2017 | Salter et al. |
| 9,789,814 | B2 | 10/2017 | Tanaka et al. |
| 11,312,323 | B2 * | 4/2022 | Navarro ................. F21S 43/14 |
| 2016/0016506 | A1 * | 1/2016 | Collins ................. B60J 10/273 362/516 |

FOREIGN PATENT DOCUMENTS

WO     2005018987     3/2005

* cited by examiner

*Primary Examiner* — Jason M Han
(74) *Attorney, Agent, or Firm* — Vichit Chea; Carlson, Gaskey & Olds, P.C.

(57) ABSTRACT

A vehicle applique lighting system includes an applique cover of a vehicle; a light source aft the applique cover; and a reflector having a portion that is outside a perimeter of the applique cover. The reflector is configured to reflect light from the light source on the first side to an opposite, second side of the applique cover.

19 Claims, 5 Drawing Sheets

VEHICLE APPLIQUE LIGHTING SYSTEM AND LIGHTING METHOD

TECHNICAL FIELD

This disclosure relates generally to applique lighting system for a vehicle and, more particularly, to an applique lighting system that can redirect light emitted from behind an applique cover to a position in front of the applique cover.

BACKGROUND

Vehicles can include various types of lighting assemblies. The lighting assemblies can be, for example, headlamps, tail lamps, side markers, decorative, or some combination of these. Lighting assemblies can illuminate for aesthetic purposes, to provide indicators, to illuminate desired areas, etc

SUMMARY

In some aspects, the techniques described herein relate to a vehicle applique lighting system, including: an applique cover of a vehicle; a light source aft the applique cover; and a reflector having a portion that is outside a perimeter of the applique cover. The reflector configured to reflect light from the light source on the first side to an opposite, second side of the applique cover.

In some aspects, the techniques described herein relate to a vehicle applique lighting system, wherein the reflector reflects the light at a position that is outside the perimeter of the applique cover.

In some aspects, the techniques described herein relate to a vehicle applique lighting system, wherein the light source emits light vertically downward toward the reflector.

In some aspects, the techniques described herein relate to a vehicle applique lighting system, wherein the light source additionally emits light outboard toward a passenger side of the applique cover and outboard toward a driver side of the applique cover.

In some aspects, the techniques described herein relate to a vehicle applique lighting system, wherein the light source is an LED strip.

In some aspects, the techniques described herein relate to a vehicle applique lighting system, wherein the light source is hidden behind the applique cover relative to a forward facing side of the applique cover.

In some aspects, the techniques described herein relate to a vehicle applique lighting system, wherein the applique cover is a front applique cover.

In some aspects, the techniques described herein relate to a vehicle applique lighting system, wherein the applique cover is a grille.

In some aspects, the techniques described herein relate to a vehicle applique lighting system, wherein the reflector is copper.

In some aspects, the techniques described herein relate to a vehicle applique lighting system, wherein the reflector curves forward from a position inside a perimeter of the applique cover to a position outside a perimeter of the applique cover.

In some aspects, the techniques described herein relate to a vehicle applique lighting system, wherein the applique cover is disposed laterally between front headlights of the vehicle.

In some aspects, the techniques described herein relate to a vehicle applique lighting system, wherein the light source includes ultra-violet charging LED strips.

In some aspects, the techniques described herein relate to a vehicle applique lighting method, including: emitting light from a light source that is on a first side of an applique cover; and reflecting the light from the light source to a position that is on an opposite, second side of the applique cover.

In some aspects, the techniques described herein relate to a vehicle applique lighting method, further including reflecting the light using a reflector that extends from a position inside a perimeter of the applique cover to a position outside the perimeter of the applique cover.

In some aspects, the techniques described herein relate to a vehicle applique lighting method, wherein the reflecting is at a position that is outside a perimeter of the applique cover.

In some aspects, the techniques described herein relate to a vehicle applique lighting method, wherein the emitting is vertically downward and outboard.

In some aspects, the techniques described herein relate to a vehicle applique lighting method, wherein the first side is an aft side, wherein the second side is a front side.

In some aspects, the techniques described herein relate to a vehicle applique lighting method, further including covering the light source with the applique cover.

In some aspects, the techniques described herein relate to a vehicle applique lighting method, wherein the applique cover is disposed between a passenger side front headlight and a driver side front headlight.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary lighting systems and lighting methods associated with an applique assembly. The lighting systems and lighting methods can cause light to be emitted outward past a perimeter of an applique cover from a position behind the applique cover. The light is then reflected around the perimeter of the applique cover.

Figure 1:
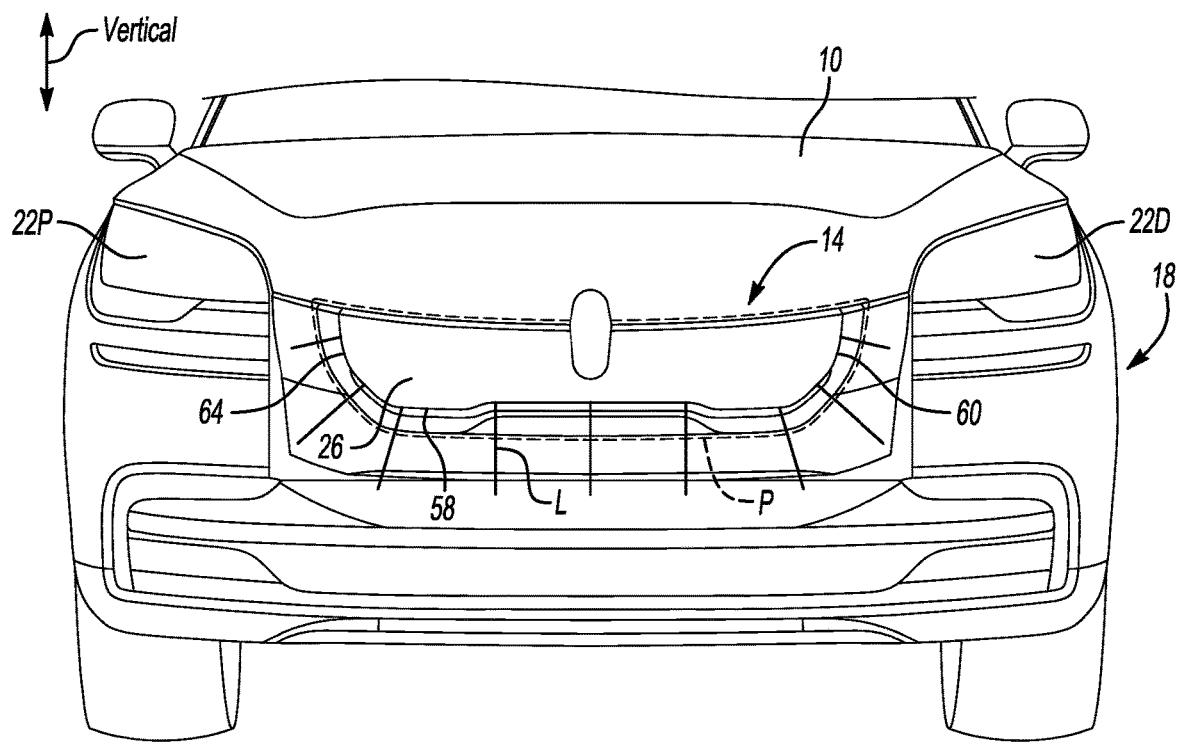
FIG. 1 illustrates a front view of a vehicle having an applique assembly.
Figure 2:
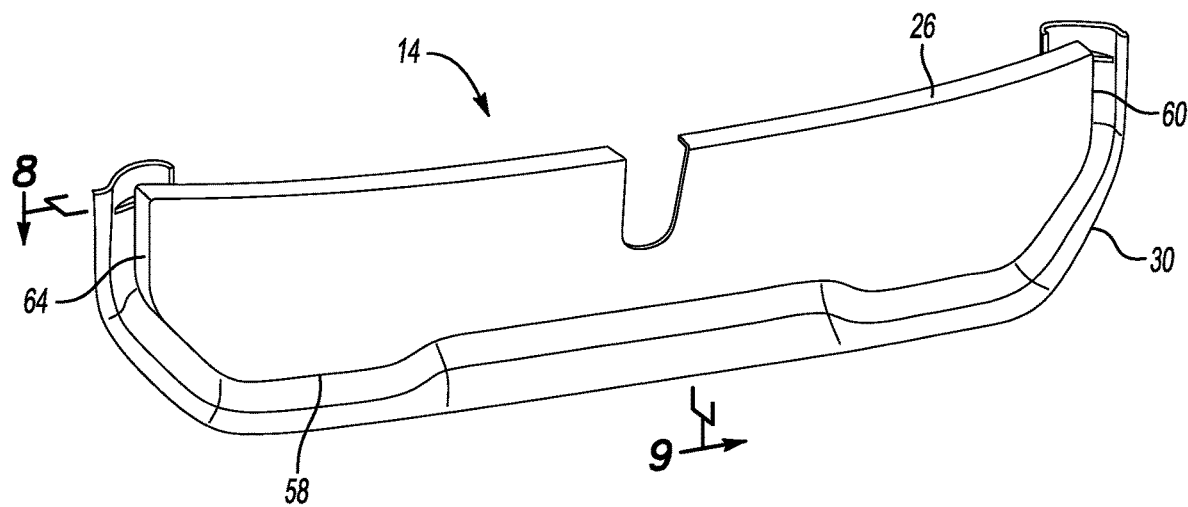
FIG. 2 illustrates a front perspective view of the applique assembly of FIG. 1.
Figure 3:
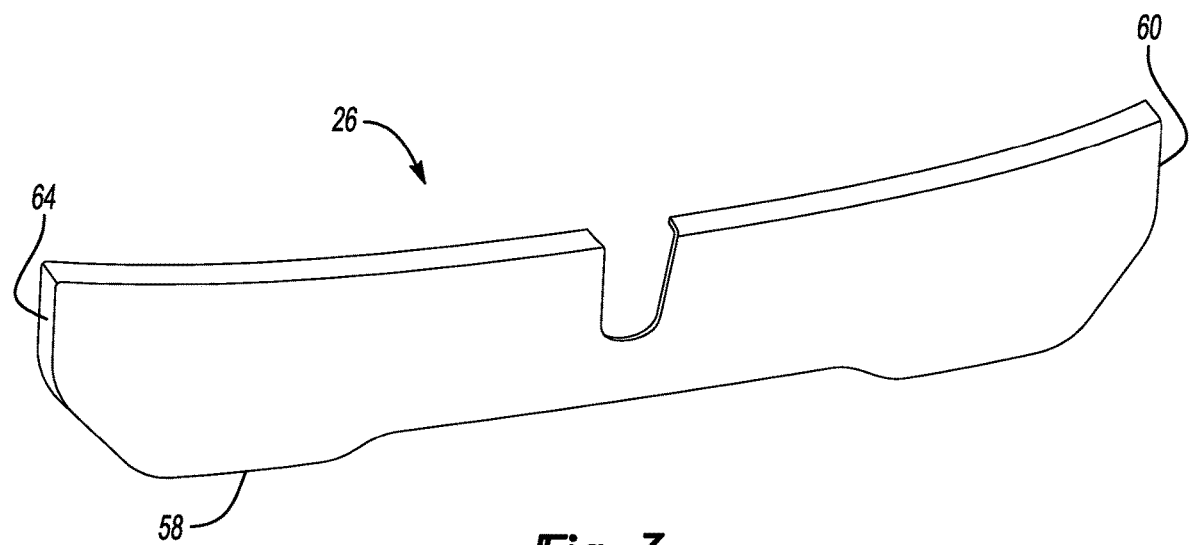
FIG. 3 illustrates a front perspective view of an applique cover from the applique assembly of FIG. 1.
Figure 4:
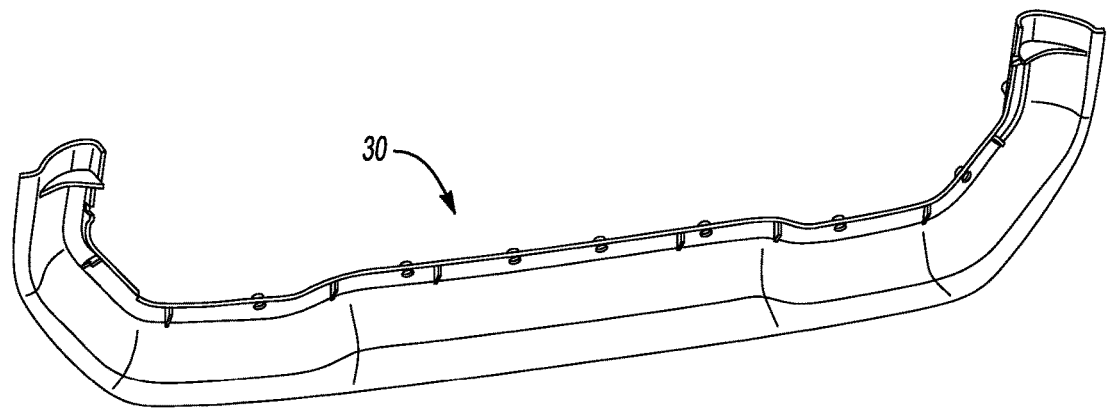
FIG. 4 illustrates a front perspective view of a reflector from the applique assembly of FIG. 1.
Figure 5:
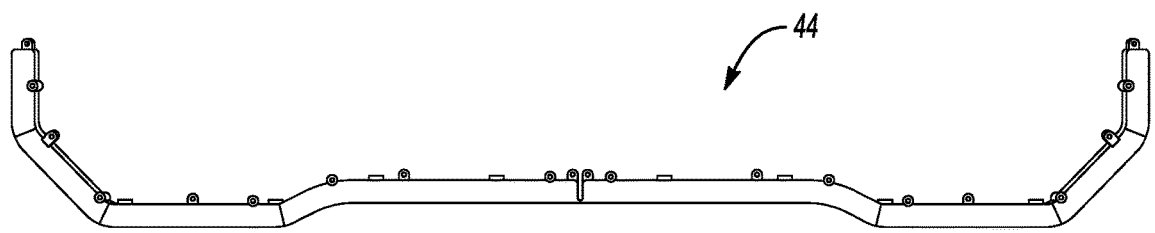
FIG. 5 illustrates a front view of a light housing from the applique assembly of FIG. 1.
Figure 6:
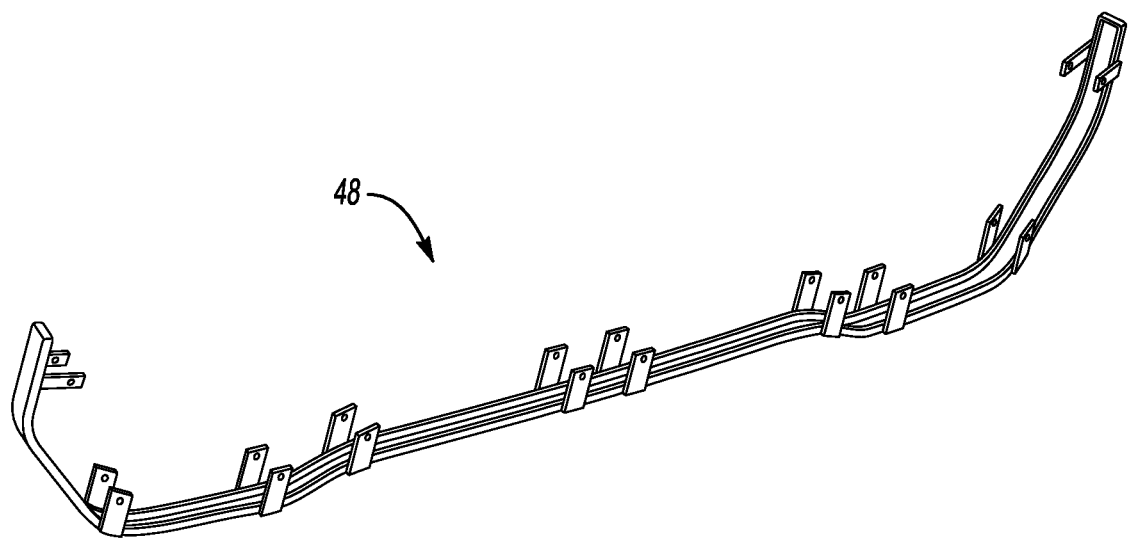
FIG. 6 illustrates a front perspective view of a lens from the applique assembly of FIG. 1.
Figure 7:
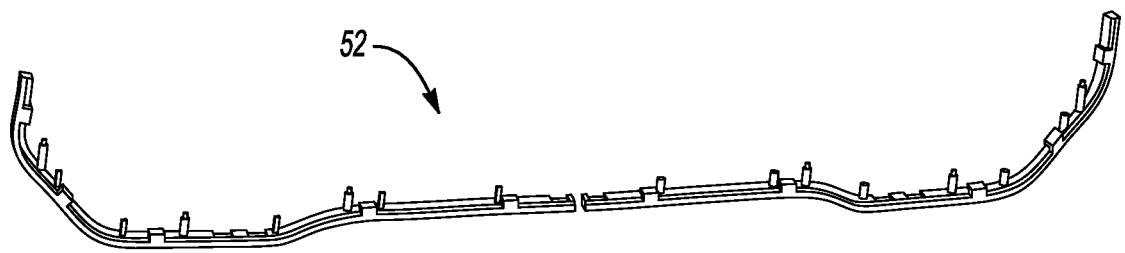
FIG. 7 illustrates a front perspective view of a light source from the applique assembly of FIG. 1.
Figure 8:
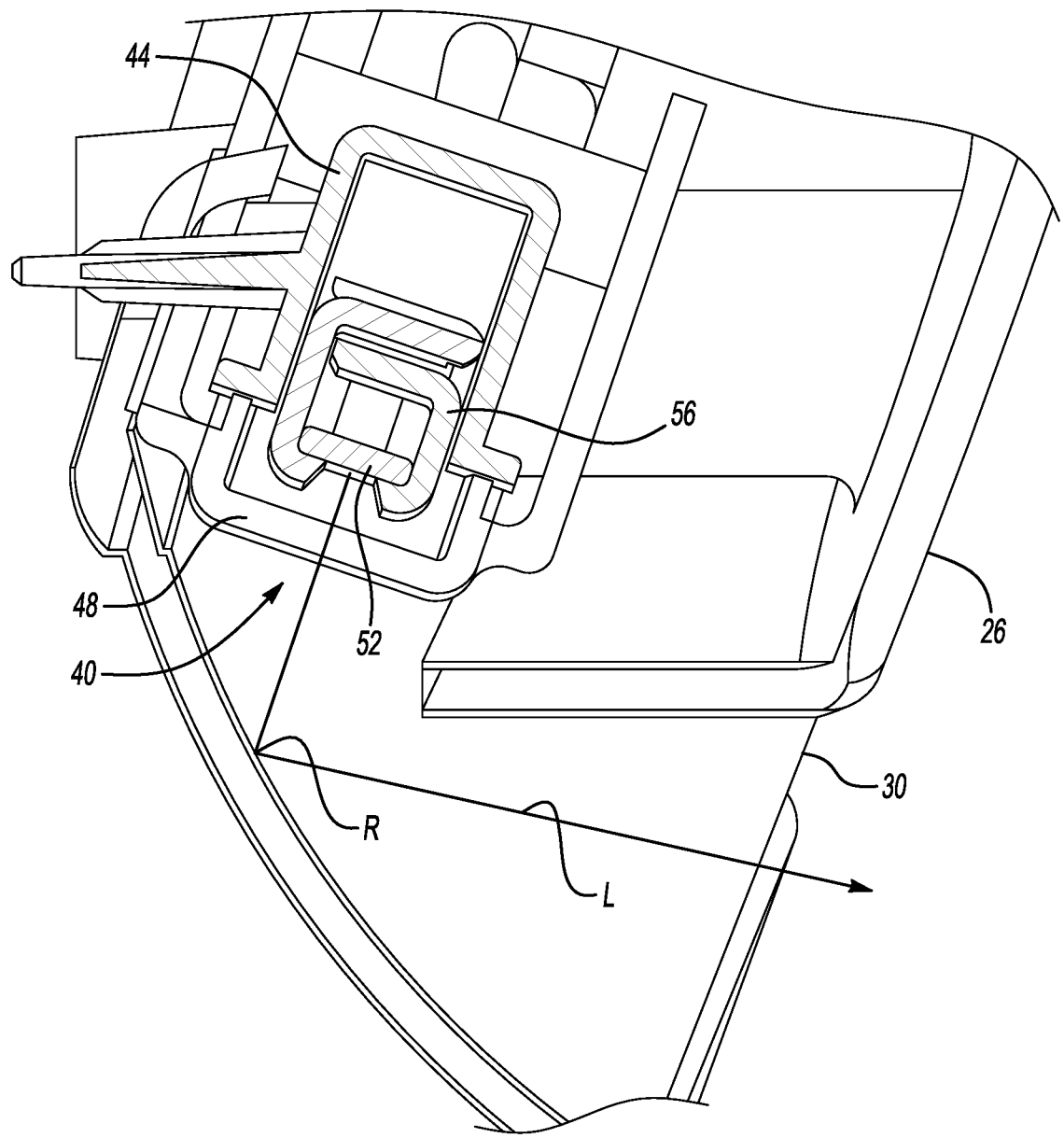
FIG. 8 illustrates a section view taken at line 8-8 in FIG. 2.
Figure 9:
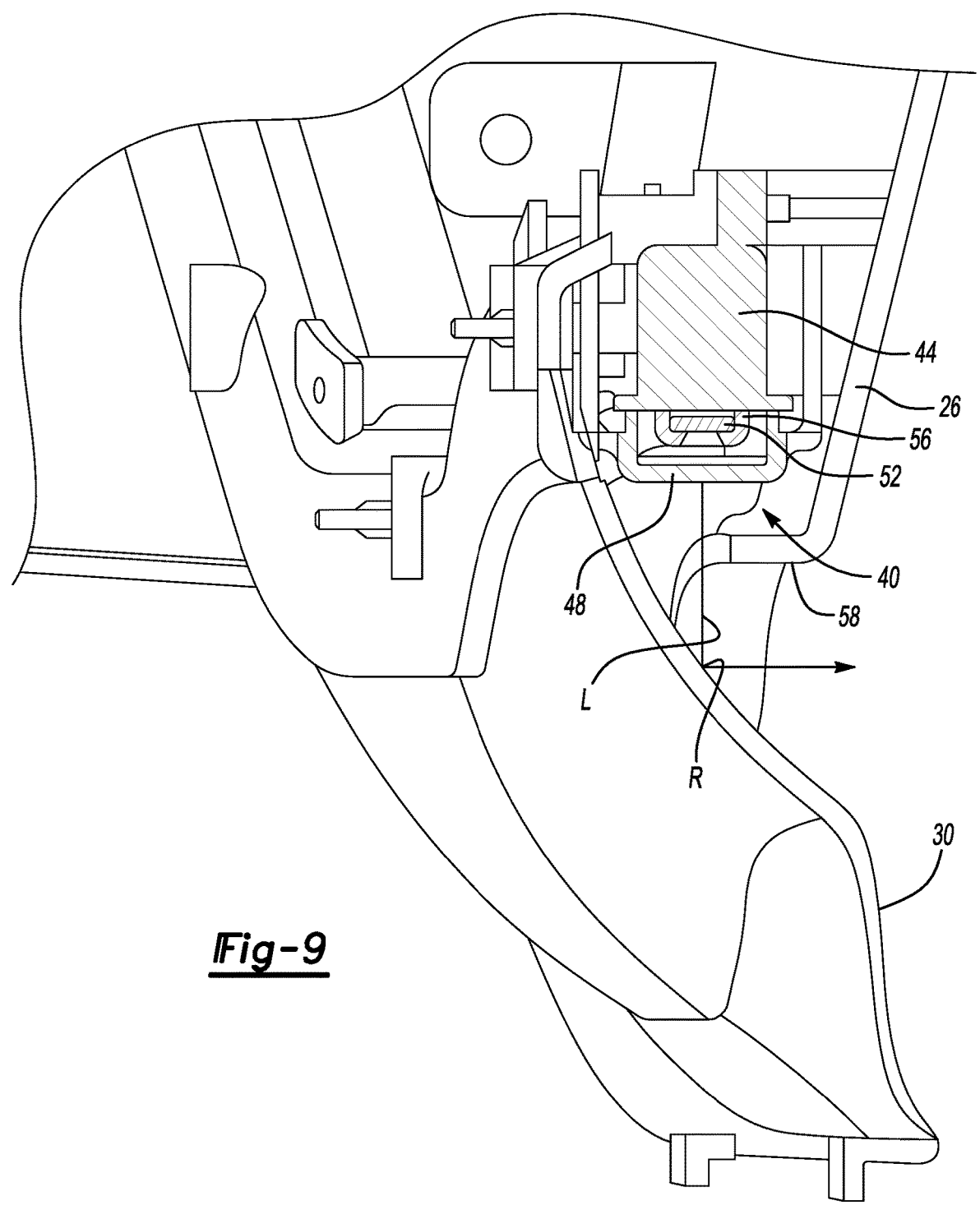
FIG. 9 illustrates a section view taken at line 9-9 in FIG. 2.

With reference to FIG. 1, an example vehicle 10 includes an applique assembly 14 disposed at a front end 18 of the vehicle 10 between a passenger side front headlight 22P and a driver side front headlight 22D of the vehicle 10.

The applique assembly 14 could be located in other areas of the vehicle 10 in other examples. For example, the applique assembly 14 could be located at an aft end of the vehicle 10.

The applique assembly 14 includes an applique cover 26 that can aesthetically enhance the vehicle 10 and can provide a location for badging and branding of the vehicle 10. The applique cover 26 can also influence aerodynamics.

In this example, the applique cover 26 does not include airflow openings because the vehicle 10 is an all-electric vehicle that does not require airflow to an engine compartment area. In other examples, the vehicle 10 could be a conventional vehicle having an engine compartment. In such an example, the applique cover 26 could be a grille having airflow openings to permit airflow to the engine compartment.

With reference now to FIGS. 2-9 and continuing reference to FIG. 1, the applique assembly 14 includes, in addition to the applique cover 26, a reflector 30, and a light bar assembly 40. In this example, the light bar assembly 40 includes a lamp housing 44, and lens 48, a light source 52, and locator brackets 56.

Notably, when the applique assembly 14 is viewed from in front of the vehicle 10 as shown in FIG. 1, the light bar assembly 40 is hidden from view by the applique cover 26. That is, the light bar assembly 40 does not extend past a perimeter P of the applique cover 26. The light bar assembly 40 and, in particular, the light source 52 of the light bar assembly 40, is hidden behind the applique cover 26 relative to a forward facing side of the applique cover.

The reflector 30 extends vertically downward past a lower side 58 of the applique cover 26. Vertical, for purposes of this disclosure, is with reference to ground and a general orientation of the vehicle 10 during operation.

The reflector 30 additionally extends laterally outward past a driver side 60 of the applique cover 26, and laterally outward past a passenger side 64 of the applique cover 26. The reflector 30 curves forward as the reflector 30 extends downward and laterally outward. Forward is with reference to an orientation of the vehicle 10. In particular, the reflector 30 curves forward from a position inside the perimeter P to a position outside the perimeter P.

The light source 52 is held within the lamp housing 44 and covered by the lens 48. The light source 52, lamp housing 44, and lens 48 combine to provide a light bar assembly that has a general "U" shaped profile. The locator brackets 56 help to locate the light source 52.

The light bar assembly 40 extends along a vertically lower portion of the applique cover 26 and upwards along the outboard portions of the applique cover 26. The light bar assembly 40, however, does not protrude past the perimeter P of the applique cover 26. Hiding the light bar assembly 40 behind the applique cover 26 can protect the light bar assembly 40 from debris, such as stone chips. Hiding the light bar assembly 40 behind the applique cover 26 may also be more aesthetically desirable.

The example light source 52 comprises two strips of Light Emitting Diodes. The light source 52 can be activated to emit light L through the lens 48. The light L from the light source 52 initially moves downward, laterally outward, or some combination of these. Eventually, the light L is reflected off the reflector 30 and is emitted forward about areas of the perimeter P of the applique cover 26. The light L thus moves from a first, aft side of the applique cover 26 to an opposite, second side of the applique cover 26.

In this example, the light L is reflected off of the reflector 30 at positions R, which are outside the perimeter P of the applique cover 26. In another example, the light L can be reflected off of the reflector 30 at a position inside the perimeter of the applique cover 26, but still emitted forward in front of the vehicle 10.

The reflector 30 can be a variety of materials, including polymer-based materials, metals, and metal alloys. In this example, the reflector 30 is copper. The reflector 30 could be other materials in other examples, including other reflective materials. The reflector 30 could incorporate long persistent phosphors, metallization, and other treatments.

Areas of the applique assembly 14 could, in some examples, emit light from areas other than the light source 52. For example, the applique cover 26 could include long persistence phosphor material, and the light source 52 could include ultra-violet charging LED strips that, when activated, charge the long persistence phosphor material. In such an example, provided the long persistence phosphor materials are charged, the long persistence phosphor materials can continue to emit light after the light source 52 is turned off. The long persistence phosphor materials could emit light in different colors and in different directions—white forward and red aft, for example. The applique cover 26 could be painted with long persistence phosphors that are excited by light from ultra violet light emitted from the light source 52.

The light source 52 can light up automatically as a user approaches the vehicle 10. In some examples, the light source 52 could include color changeable lighting elements, such as RGB LEDs, which can enable the user to select desired colors for the light emanating from behind the applique cover 26. The user could select desired colors using a human machine interface within the vehicle 10 or via a mobile device. The light source 52 could include the ultra-violet charging LED strips, RGB LEDs, LED strips, LEDs, or some combination of these.

In some examples, the light source 52 can be illuminated to provide, for example, a supplemental Daytime Running Lamp (DRL), or supplemental lighting used when the vehicle 10 is pulled over on a busy road.

The intensity of the light from the light source 52 can be adjustable. In an example, the light source 52 emits a soft white light when the vehicle 10 is keyed off, which may provide a security feature.

In some examples, only selected areas of the light source 52 are illuminated. For example, a driver side of the light source 52 could be illuminated in an amber color to provide a supplemental turn indicator. If the applique assembly 14 is used at a rear of the vehicle, the light source 52 is used within the applique assembly 14 can also include lighting up certain areas to provide supplemental turn indicators. When used at the rear of the vehicle 10, the light source 52 could provide supplemental taillamps, stop lamps, backup lamps, or some combination of these.

The light source 52 could emit light as confirmations. For example, when a user locks the vehicle 10, the light source 52 could blink three times in a red color, and then fade to a color chose by the user.

The user, in some examples, can program a light show using lamps of the vehicle 10 and the light source 52.

The light source 52 could provide supplemental lighting when the vehicle 10 is being serviced along a roadside, for example. In another example, as the user approaches vehicle 10 with a key fob the light source 52 will glow on without the vehicle 10 starting as part of a welcome feature. Upon turning off and exiting the vehicle 10 a farewell feature will function. In the event the key fob is left in the vehicle 10 and the vehicle 10 is locked, the light source 52 can blink alternately between red and white and a horn of the vehicle 10 will sound until the key fob is retrieved from the vehicle 10. This can help to alert that the key fob has been left behind.

Features of the disclosed examples include an applique cover not being the light source, but appearing as a light source since the applique cover is illuminated from behind and from the light reflected onto the reflector. The light source is protected from stone chips by the applique cover. The design is scalable for different size and shapes of front applique covers. The design is also flexible for rear applique covers.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle applique lighting system, comprising:
   an applique cover of a vehicle, the applique cover having a perimeter that is established by a vertically upper side of the applique cover, a vertically lower side of the applique cover, a passenger side of the applique cover, and a driver side of the applique cover;
   a light source on an aft side of the applique cover; and
   a reflector having a portion that is outside the perimeter of the applique cover, the reflector configured to reflect light from the light source on the aft side forward from the vehicle past a forward side of the applique cover,
   wherein the reflector is configured to reflect light from the light source on the aft side forward from the vehicle past a forward side of the applique cover without the light passing through any portion of the applique cover.

2. The vehicle applique lighting system of claim 1, wherein the reflector is configured to reflect the light at on a passenger side of the reflector at a position that is further outboard than the passenger side of the applique cover.

3. The vehicle applique lighting system of claim 1, wherein the light source emits light vertically downward toward the reflector, the reflector configured to reflect the light emitted downward at a position that is vertically lower than the vertically lower side of the applique cover.

4. The vehicle applique lighting system of claim 3, wherein the light source additionally emits light outboard toward a passenger side of the applique cover and outboard toward a driver side of the applique cover, the light emitted outboard toward the passenger side reflected by the reflector at a passenger side position that is further outboard than the passenger side of the applique cover, the light emitted outboard toward the driver side reflected by the reflector at a driver side position that is further outboard than the driver side of the applique cover.

5. The vehicle applique lighting system of claim 1, wherein the light source is an LED strip.

6. The vehicle applique lighting system of claim 1, wherein the light source is hidden behind the applique cover relative to a forward facing side of the applique cover.

7. The vehicle applique lighting system of claim 1, wherein the applique cover is a front applique cover.

8. The vehicle applique lighting system of claim 1, wherein the applique cover is a grille.

9. The vehicle applique lighting system of claim 1, wherein the reflector is copper.

10. The vehicle applique lighting system of claim 1, wherein the reflector curves forward from a position inboard a perimeter of the applique cover to a position outboard the perimeter of the applique cover.

11. The vehicle applique lighting system of claim 1, wherein the applique cover is disposed laterally between front headlights of the vehicle.

12. The vehicle applique lighting system of claim 1, wherein the light source includes ultra-violet charging LED strips.

13. The vehicle applique lighting system of claim 1, wherein the perimeter is in a plane that is entirely transverse to a longitudinal axis of the vehicle.

14. The vehicle applique lighting system of claim 1, wherein outside the perimeter is with reference to the applique covered being viewed from a position in front of the vehicle.

15. A vehicle applique lighting method, comprising:
    emitting light from a light source that is on an aft side of an applique cover of a vehicle, the light source emitting light outward from a position within a perimeter of the applique cover to a position outside the perimeter of the applique cover, the perimeter established by a vertically uppermost edge of the applique cover, a vertically lowermost edge of the applique cover, a passenger side outermost of the applique cover, and a driver side outermost of the applique cover; and
    at the position outside the perimeter of the applique cover, using a reflector to reflect the light from the light source to a position that is on forward side of the applique cover,
    wherein the reflector is configured to reflect light from the light source on the aft side forward from the vehicle past a forward side of the applique cover without the light passing through any portion of the applique cover.

16. The vehicle applique lighting method of claim 15, further comprising reflecting the light using a reflector that extends from the position inside the perimeter of the applique cover to the position outside the perimeter of the applique cover.

17. The vehicle applique lighting method of claim 15, wherein the emitting is vertically downward and outboard relative to a longitudinal axis of the vehicle.

18. The vehicle applique lighting method of claim 15, further comprising covering the light source with the applique cover.

19. The vehicle applique lighting method of claim 15, wherein the applique cover is disposed between a passenger side front headlight and a driver side front headlight, wherein the reflecting redirects the light forward relative to an orientation of the vehicle.

* * * * *